United States Patent [19]
Holmes

[11] Patent Number: 5,430,450
[45] Date of Patent: Jul. 4, 1995

[54] METHOD AND APPARATUS FOR AUTOMATICALLY DIMMING MOTOR VEHICLE HEADLIGHTS USING RADAR SIGNAL

[75] Inventor: Douglas N. Holmes, Novi, Mich.

[73] Assignee: Ford Motor Company, Dearborn, Mich.

[21] Appl. No.: 235,259

[22] Filed: Apr. 29, 1994

Related U.S. Application Data

[63] Continuation of Ser. No. 16,321, Feb. 10, 1993, abandoned.

[51] Int. Cl.$^6$ ............................................... G01S 13/52
[52] U.S. Cl. ............................................................ 342/69
[58] Field of Search ..................... 342/61, 69, 70, 71, 342/72, 82, 83, 155, 156, 109, 110, 111, 112, 107, 108, 196

[56] References Cited

U.S. PATENT DOCUMENTS

| | | | |
|---|---|---|---|
| 3,683,379 | 8/1972 | Saddler et al. | 342/71 |
| 3,725,923 | 3/1973 | Bosc et al. | 342/107 |
| 4,603,973 | 8/1986 | Crow | 356/5 |
| 4,673,937 | 6/1987 | Davis | 342/72 |
| 4,862,037 | 8/1989 | Farber et al. | 315/83 |
| 4,916,450 | 4/1990 | Davis | 342/71 |
| 4,933,852 | 6/1990 | Lemelson | 364/424.03 |
| 5,091,726 | 2/1992 | Shyu | 340/904 |
| 5,165,497 | 11/1992 | Chi | 180/169 |
| 5,166,681 | 11/1992 | Bottesch et al. | 340/933 |

FOREIGN PATENT DOCUMENTS 60-64044 4/1985 Japan.

Primary Examiner—Daniel T. Pihulic
Attorney, Agent, or Firm—Mark L. Mollon; Roger L. May

[57] ABSTRACT

The intensity of the headlights of a motor vehicle are modulated in response to pulsed Doppler radar signals which are used to distinguish between moving vehicles and other objects. The radar signals scan an area generally in front of the host vehicle. Reflected radar signals are received and radar return signals representative thereof are generated. A time to frequency domain transform, preferably a fast Fourier transform, is performed on the radar return signals to produce radar frequency signals. An adaptive technique is used to identify portions of the radar frequency signals produced by reflections from significant objects. The Doppler effect is used to determine the velocity of detected objects to the host vehicle. Any difference between the relative velocity of a detected object and the velocity of the host vehicle indicates that the object is moving. The velocity of the host vehicle may be determined by a conventional speed sensor or by means of radar signals reflected from a stationary object. Distance between the vehicle and a moving object is determined from the travel time of radar signals reflected from the moving object. The headlights of the host vehicle are modulated when a moving object is a predetermined distance from the host vehicle.

20 Claims, 3 Drawing Sheets

METHOD AND APPARATUS FOR AUTOMATICALLY DIMMING MOTOR VEHICLE HEADLIGHTS USING RADAR SIGNAL

RELATED APPLICATIONS

This application is a continuation of U.S. application Ser. No. 08/016,321 filed on Feb. 10, 1993, now abandoned.

BACKGROUND OF THE INVENTION

The present invention relates generally to automatic headlight dimming systems for motor vehicles and, more particularly, to a method and apparatus for automatically dimming the headlights of a vehicle wherein a radar is used to detect and identify other vehicles moving within a predetermined area.

Various systems have been developed to provide automatic headlight illumination control in motor vehicles using radar signals. For example, Japanese Patent Document No. 60 64 044 discloses a headlight control device for controlling the illumination range of the headlights based on the speed of the vehicle and the distance to a detected object. The device also changes the optical axis angle of the headlights if an existing illumination pattern and the distance to a detected object indicate that the existing illumination pattern is too bright for an oncoming vehicle at that distance.

During operation, a radar device emits an electromagnetic wave which is reflected by a detected object which can be an approaching vehicle, road sign or other object. The transmission time of the radar signal is used to calculate the distance to the detected object. The illumination distance of the headlights is then regulated based on the distance to the detecting object and the speed of the subject vehicle determined by a vehicle speed sensor.

A significant problem associated with the above described system, and other prior systems, is the persistent occurrence of unwanted changes in headlight illumination caused by stationary objects, such as road signs and guardrails. The above system responds to detected objects solely on the basis of distances of the objects from the subject vehicle. Thus, stationary objects are indistinguishable from approaching vehicles and frequently cause unwanted modulation of the headlight intensity.

Additional problems arise since the above system uses a stationary radar antenna principally focused on the oncoming lane of a two lane highway. Consequently, only objects such as vehicles approaching in a lane adjacent to the driver's side of the vehicle are detected. Vehicles travelling in the same direction or in a nonadjacent lane are not detected and, therefore, do not cause a decrease in headlight intensity. Further, the accuracy of known vehicle speed sensors can vary dependent upon a number of factors including changes in tire size on the vehicle.

It is thus apparent that a need exists for an improved method and apparatus for modulating the intensity of the headlights of a vehicle using radar signals which discriminate between moving vehicles and other objects, measures vehicle speed independently of vehicle factors which influence conventional speed sensors, and detects moving vehicles travelling in the same direction and in nonadjacent lanes.

SUMMARY OF THE INVENTION

This need is met by a method and apparatus in accordance with the present invention for modulating the intensity of the headlights of a motor vehicle wherein pulsed Doppler radar signals are used to distinguish between moving vehicles and other objects. Radar signals are transmitted by an antenna in a scanning area generally in front of the host vehicle. Reflected radar signals are received by the antenna and radar return signals representative of the reflected radar signals are generated.

A time to frequency domain transform, preferably a fast Fourier transform, is performed on the radar return signal to produce radar frequency signals. An adaptive technique, such as the Constant False Alarm Rate technique, is applied to the radar frequency signal to identify portions of the radar frequency signals produced by radar reflections from significant objects. The Doppler effect is then used to determine the relative velocities of the detected objects. Any difference between the relative velocity of a detected object and the velocity of the host vehicle indicates that the object is moving.

The velocity of the host vehicle may be determined by a conventional speed sensor or by measuring the travel time of the radar signal to and from a stationary object or ground clutter. Distance between the vehicle and the moving object is determined by measuring the time of travel for the radar signal reflected from the moving object. When the moving object is a predetermined distance from the host vehicle, the headlights of the host vehicle are modulated.

In accordance with one aspect of the present invention, a method for modulating the intensity of at least one headlight of a motor vehicle comprises the steps of: transmitting a radar signal; receiving reflections of the radar signal; generating a radar return signal indicative of the reflected radar signal; processing the radar return signal to determine if any portion of the radar return signal was produced by reflection from an object moving relative to the vehicle; and, modulating the intensity of the at least one headlight in response to detection of a moving object.

Preferably, the step of processing the radar return signal further comprises the steps of: estimating a noise power level for the radar frequency signal; establishing a threshold level which is greater than the noise power level; comparing the radar return signal to the threshold level; and, indicating that an object has been detected if the radar frequency signal exceeds the threshold level.

The step of transmitting a radar signal may comprise the steps of: transmitting the radar signal in a plurality of pulses; and scanning an area generally in front of the vehicle; and, the step of processing the radar return signal may comprise the steps of: detecting the frequency of each of the reflected radar signals; identifying reflected radar signals which are produced by reflection of the radar signals from stationary objects based on the detected frequencies of the reflected radar signals; and, determining velocity of the vehicle based on the frequency of the radar frequency signals when the radar signals were reflected from the stationary objects.

In accordance with another aspect of the present invention, an apparatus for modulating the intensity of at least one headlight of a motor vehicle comprises radar means for transmitting a radar signal, for receiving reflections of the radar signal, and for generating a radar return signal indicative of the reflected radar signal. Processor means is provided for controlling the radar means, for processing the radar return signal to determine if the radar return signal was produced by reflection of the radar signal from objects which are moving relative to the vehicle, and for generating a modulate headlights signal in response to the moving objects. Modulator means modulates the intensity of the at least one headlight in response to the modulate headlights signal.

It is thus a feature of the present invention to provide an improved method and apparatus for modulating the intensity of the headlights of a motor vehicle by distinguishing between radar detection of other moving vehicles and stationary objects.

Other features and advantages of the invention will be apparent from the following description, the accompanying drawings and the appended claims.

DETAILED DESCRIPTION OF THE INVENTION

Figure 1:
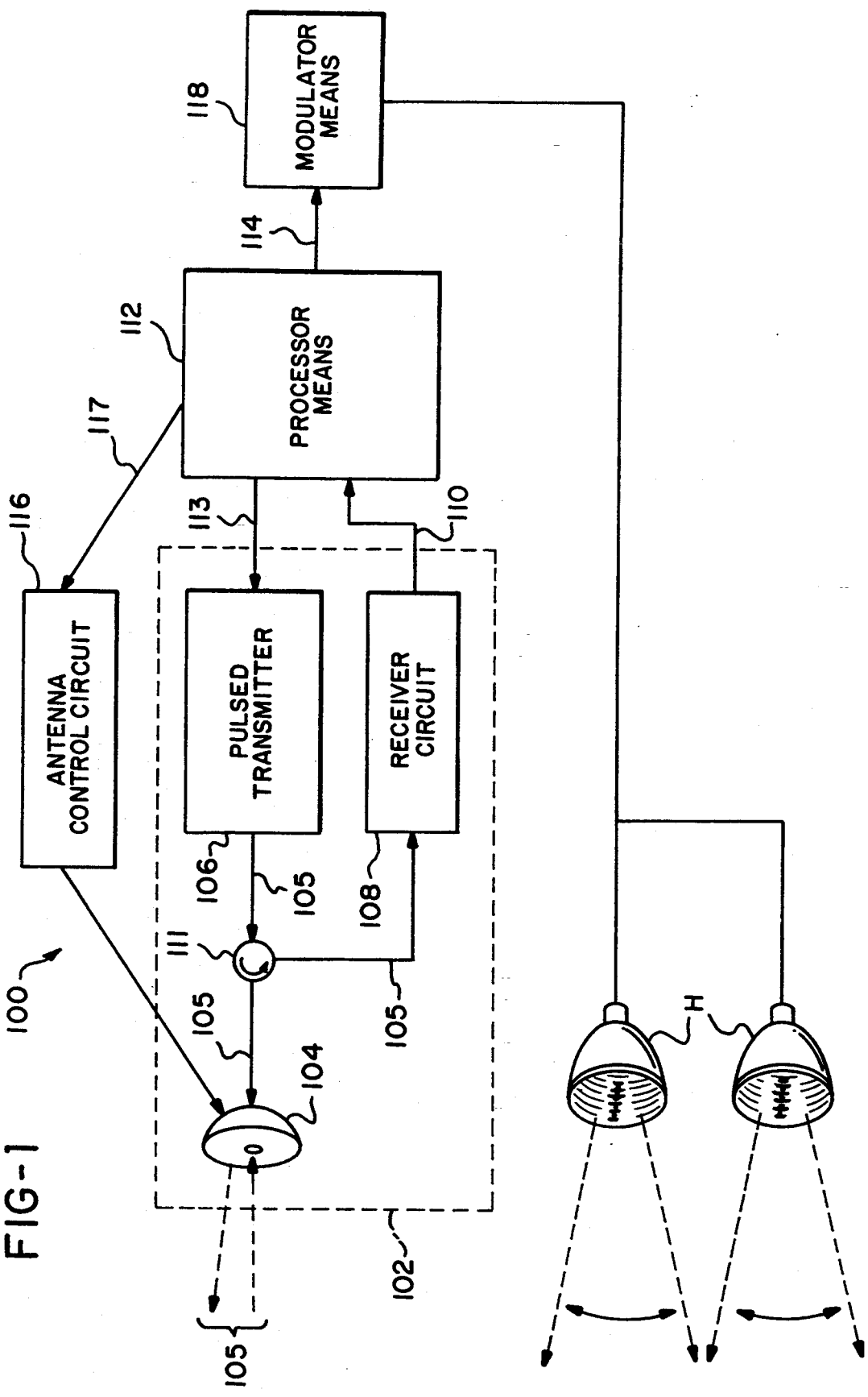
FIG. 1 is a simplified block diagram of a radar-based apparatus for modulating the intensity of the headlights of a motor vehicle in accordance with the present invention.

Reference is now made to the simplified block diagram of FIG. 1 which illustrates an apparatus, generally designated by reference numeral 100, for modulating the intensity of headlights H of a motor vehicle. Radar means 102 is shown as comprising an antenna 104 for transmitting and receiving radar signals, carried over signal paths 105, a pulsed transmitter 106 for generating blocks of pulses comprising radar signals, preferably pulsed Doppler radar signals, and a receiver circuit 108 for generating radar return signals on a signal path 110 in response to reflected radar signals received by the antenna 104.

A radar switching means 111, such as a conventional duplexer, connects the antenna 104 and the transmitter 106 during transmission of the radar signals, and connects the antenna 104 and the receiver circuit 108 during reception of the reflected radar signals. Processor means 112 controls the operation of the pulsed transmitter 106 via transmit control signals on a signal path 113, processes the radar return signals on the signal path 110 to distinguish between detection of moving vehicles and stationary objects and generates appropriate modulate headlights signals on a signal path 114.

The antenna 104 scans an area generally in front of the host vehicle. The scanning of the antenna 104 is controlled by an antenna control circuit 116 in response to scan control signals generated by the processor means 112 and carried on a signal path 117. As is well known to one skilled in the art, the design of the antenna control circuit 116 is determined by the configuration of the antenna 104. For example, the antenna 104 may be of the reflector type which is mechanically steered by a servo device or the antenna 104 may be a stationary array with electrical steering of the radiated radar signal by means of signal phasing or the like.

Modulator means 118, which may comprised switch means, modulates the intensity of the headlights H of the vehicle in response to modulate headlights signals on the signal path 114. This modulation may consist of the switching of the headlights H between a high beam mode and a low beam mode, as has been heretofore performed manually by the vehicle operator.

Figure 2:
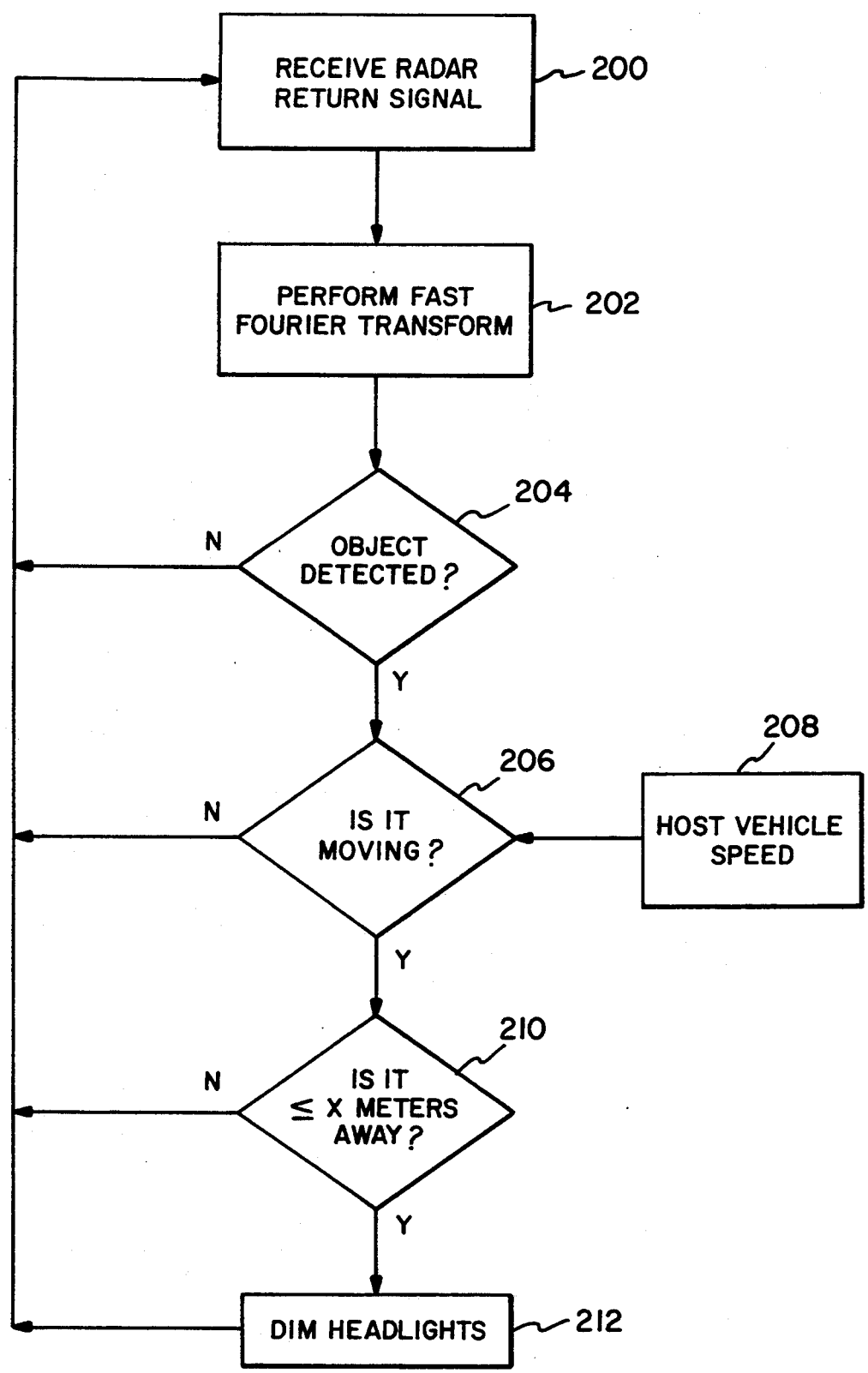
FIG. 2 is a flow chart illustrating the processing steps for the processing means of FIG. 1.

The method for modulating the intensity of the headlights H of a motor vehicle will now be described with reference to the flow chart of FIG. 2. The radar means 102 initially transmits a radar pulse in response to transmit control signals from the processor means 112. The processor means 112 then begins sampling the output of the receiver circuit 108 to detect a radar return signal, see block 200. The elapsed time between the transmission and reception of the radar signal is representative of the distance to an object from which the radar signal was reflected. The distance is determined by conventionally sampling the radar pulse in predetermined increments, each corresponding to an unique distance.

Preferably, a total of N pulses are transmitted and sampled in this manner before a time domain to frequency domain transformation is performed on the radar return signal. The time needed to transmit N radar pulses, where N is on the order of 64, is insignificant compared to the scan rate of the antenna 104 and, therefore, each block of N radar pulses is effectively transmitted at one antenna location. Successive blocks of pulses are used to create a complete map of the object space generally in front of the motor vehicle.

After transmitting and receiving N radar pulses, the radar return signal generated by the receiver circuit 108 in response to reflected radar signals is transformed from the time domain to the frequency domain to produce radar frequency signals. Preferably, the time domain to frequency domain transformation is performed using a fast Fourier transform of the radar return signal carried on signal path 110.

Although the fast Fourier transform has several computational forms which may be used, the preferred form is the Cooley-Tukey implementation. Additionally, as one skilled in the art will readily comprehend, other time domain to frequency domain transform techniques may be employed such as the well-known discrete Fourier, z, chirp-z, correlogram and the periodogram transformation techniques. Newer transformation techniques which may also be utilized include the autoregressive, moving average, and autoregressive-moving average methods.

Figure 3A:
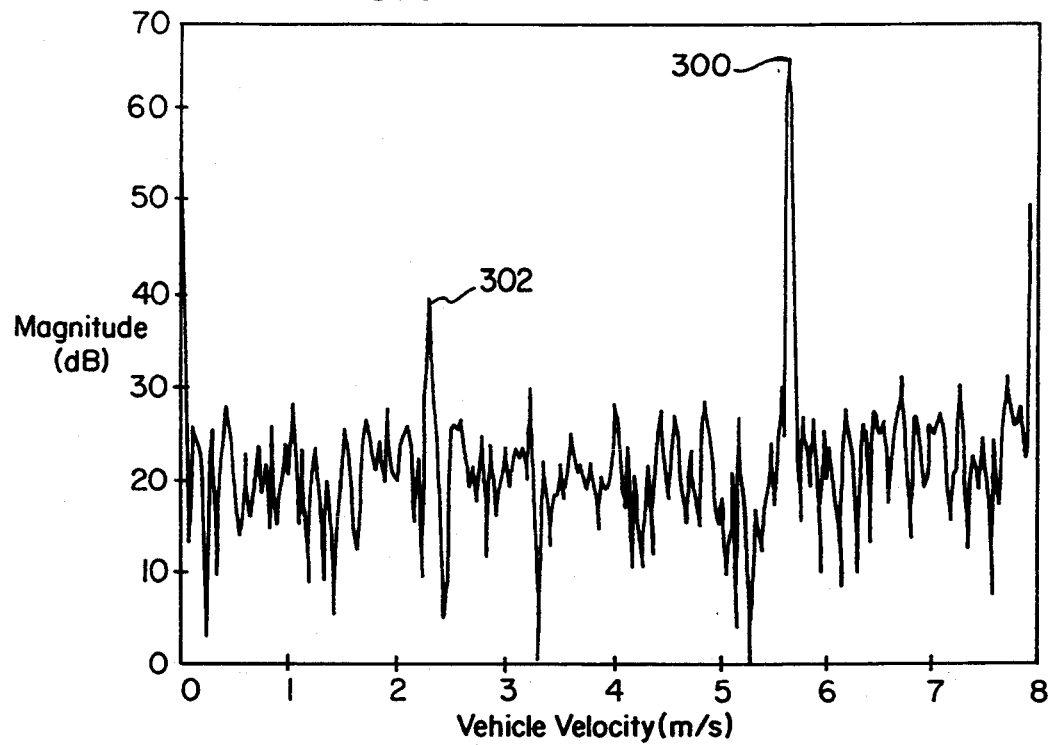
FIG. 3A is a graphical representation of an exemplary frequency spectrum of a radar frequency signal with the host vehicle travelling at 2.3 meters per second and another vehicle approaching at 5.7 meters per second; and, FIG. 3B shows a Constant False Alarm Rate (CFAR) threshold level superimposed on the frequency spectrum shown in FIG. 3A.

Since the Doppler effect provides that the velocity of any detected object is related to the frequency of the reflected radar signal, the speed of the detected object is easily determined once the data contained in the radar return signal on the signal path 110 is transformed into the frequency domain by the processor means 112. FIG. 3A is a graphical representation of a portion of an exemplary radar frequency signal for a host vehicle travelling at 2.3 meters per second. An approaching vehicle moving at 5.7 meters per second relative to the radar vehicle and ground clutter are represented by points 300 and 302, respectively. As should be readily apparent to one skilled in the art, the velocity of a detected object may also be computed directly in the time domain by observing the change in position of the object over time.

The remaining decision blocks of the flow chart of FIG. 2 will now be described in conjunction with the exemplary radar frequency signal shown in FIG. 3B. After transforming the radar return signal into the frequency domain, see block 202, the processor means 112 analyzes discrete portions, or windows, of the resulting radar frequency signal to determine whether any objects were detected, see block 204.

An adaptive technique known as Constant False Alarm Rate (CFAR) thresholding is preferably used to identify the portions of the radar frequency signal produced by reflections from significant objects, i.e. objects which should be considered relative to headlight modulation, as opposed to those produced by ground effects or signal noise. In utilizing the CFAR technique, an estimate of the noise power level within a sliding window in the spectrum of the radar frequency signal is initially made and a threshold level, shown as dashed curve 304 in FIG. 3B, is established above the estimated noise power level as the window moves through the spectrum. An object is detected when the radar frequency signal exceeds the threshold level 304.

Figure 3B:
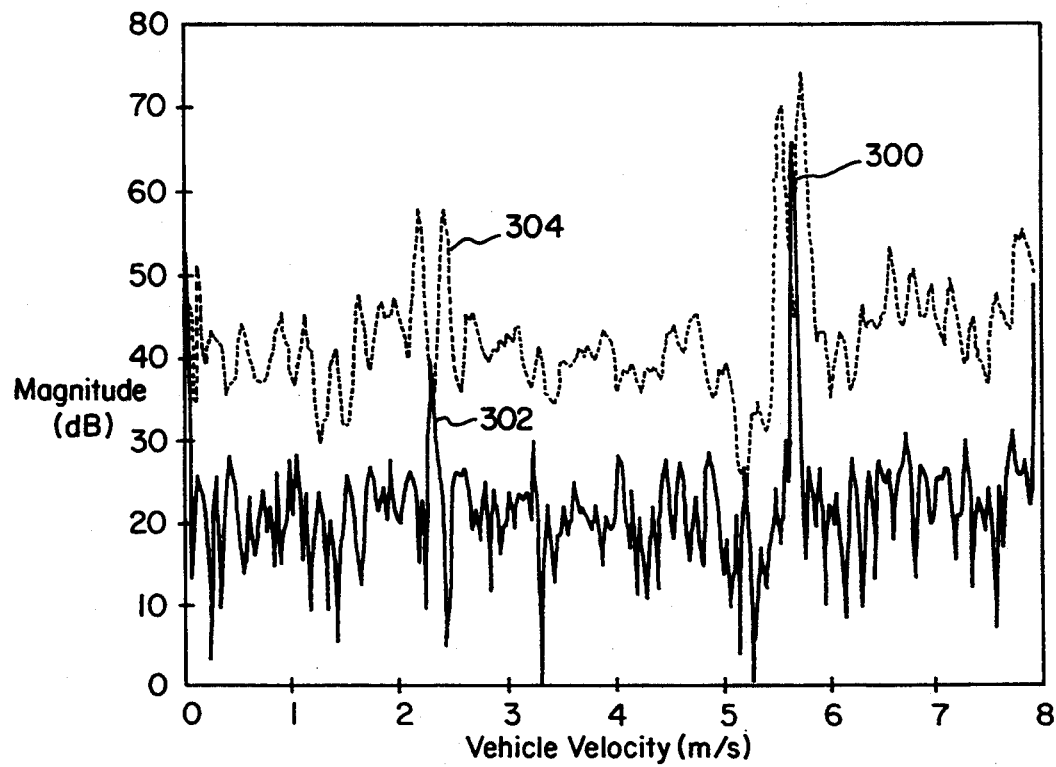

Using this analytical technique on the window of the radar frequency signal illustrated in FIG. 3B, points 300 and 302 exceed the threshold level 304 and are, therefore, considered detections of significant objects. As one skilled in the art will readily appreciate, the CFAR technique may have a variety of implementations. For example, greater-of, lesser-of and ordered statistics CFAR may be utilized. The threshold level 304 may also be determined using different procedures. A fixed threshold level may be set based on a priori knowledge of the ground clutter environment or an automatic gain control system, usually implemented in hardware, may be used. In view of the variety of these well known techniques and since they form no part of the present invention, they will not be further described herein.

After determining that a significant object has been detected, the processor means 112 determines whether the detected object is moving, see block 206, by comparing the relative speed of the detected object, as determined by the Doppler effect, and the speed of the host vehicle, see block 208. The information regarding the speed of the host vehicle may be obtained directly from a conventional speed sensor of the vehicle which is used to control the speedometer and other standard devices.

However, the present invention preferably uses the radar signal to measure the relative ground speed of the host vehicle. By autonomously measuring the host vehicle speed, the accuracy of the speed measurement is increased. In determining the speed of the host vehicle, the processor means 112 analyzes the radar frequency signal from different antenna positions, such as $-10$, 0, and $+10$ degrees, and at several different time periods. As delineated above, the distance from the host vehicle to an object is directly related to the travel time of the radar signal. Thus, by examining the radar frequency signal at different time periods, or ranges, radar returns from objects located at various distances from the host vehicle can be analyzed.

All of the analyzed signal spectra will have reflected radar signals from various ground clutter. The processor means 112 distinguishes the radar return created by ground clutter from radar return created by moving objects by examining the various spectra and determining which frequency is most frequently detected. Since the ground clutter is stationary, the most frequently occurring frequency in the examined spectra is directly proportional to the host vehicle speed.

The processor means 112 now determines whether the detected object is moving, see block 206, and, consequently, distinguishes between moving objects and stationary objects, such as street signs, guardrails and parked cars. A simple comparison of the frequency of any detected object to the above-determined frequency of the ground clutter will determine if the detected object is moving. If the frequencies are identical, the detected object is stationary. If the frequencies differ, the detected object is an object moving toward or away from the host vehicle.

Subsequent to detection of a moving object, the processor means 112 determines if the detected moving object is within a predetermined distance from the host vehicle, see block 210. This is accomplished by measuring the time of travel for the radar signal reflected from the moving object. If the moving object is within the predetermined distance the processor means 112 instructs the modulator means 118 via the modulate headlights signals carried on the signal path 114 to modulate the intensity of the headlights H of the host vehicle from the high beam mode to the low beam mode. After the moving object has passed, the modulator means 118, in accordance with instructions from the processor means 112, will switch the headlights H to the high beam mode.

Having thus described the apparatus and method for modulating the intensity of the headlights of a motor vehicle of the present invention in detail and by reference to preferred embodiments thereof, it will be apparent that modifications and variations are possible without departing from the scope of the invention defined in the appended claims.

What is claimed is:

1. A method for modulating the intensity of at least one headlight of a motor vehicle, said at least one headlight being capable of operating in at least a high beam mode and a low beam mode, said method comprising the steps of:

transmitting a radar signal in a plurality of pulses;
   receiving reflections of said radar signal;
   determining a time between transmitting said radar signal and receiving said reflections of said radar signal;
   generating a radar return signal indicative of said reflected radar signal;
   processing said radar return signal to determine from the phase shift of said reflected radar signal if any portion of said radar return signal was produced by reflection from an object moving relative to said vehicle;
   determining a distance between said motor vehicle and said object moving relative to said vehicle based on said determined time; and
   modulating the intensity of said at least one headlight in response to detection of a moving object and said distance between said motor vehicle and said moving object.

2. The method for modulating the intensity of at least one headlight of a motor vehicle as recited in claim 1 wherein said step of transmitting a radar signal comprises the step of scanning an area generally in front of said vehicle.

3. The method for modulating the intensity of at least one headlight of a motor vehicle as recited in claim 1 wherein said step of processing said radar return signal comprises the steps of:
- determining velocity of said vehicle;
- determining velocities of detected objects relative to said vehicle based on said reflected radar signals and said velocity of said vehicle;
- comparing said velocity of said vehicle and said velocities of said detected objects; and
- determining which of said detected objects are moving objects.

4. The method for modulating the intensity of at least one headlight of a motor vehicle as recited in claim 1, further comprising the steps of:
- comparing said distance between said motor vehicle and said moving object to a predetermined distance;
- modulating the intensity of said at least one headlight from a high beam mode to a low beam mode when said moving object is within said predetermined distance from said vehicle; and
- maintaining said low beam mode while said distance between said moving object and said vehicle remains detectable and while said moving object remains within said predetermined distance from said vehicle.

5. The method for modulating the intensity of at least one headlight of a motor vehicle as recited in claim 1 wherein said step of processing said radar return signal comprises the step of performing a time domain to frequency domain transform on said radar return signal to produce a radar frequency signal.

6. The method for modulating the intensity of at least one headlight of a motor vehicle as recited in claim 5 wherein said step of performing a time domain to frequency domain transform on said radar return signal comprises the step of performing a fast Fourier transform of said radar return signal to produce said radar frequency signal.

7. The method for modulating the intensity of at least one headlight of a motor vehicle as recited in claim 5 wherein said step of processing said radar return signal further comprises the steps of:
- estimating a noise power level for said radar frequency signal;
- establishing a threshold level which is greater than said noise power level;
- comparing said radar return signal to said threshold level; and
- indicating that an object has been detected if said radar frequency signal exceeds said threshold level.

8. The method for modulating the intensity of at least one headlight of a motor vehicle as recited in claim 5 wherein said step of transmitting a radar signal comprises the step of scanning an area generally in front of said vehicle; and,
said step of processing said radar return signal comprises the steps of:
- detecting the frequency of each of said reflected radar signals;
- identifying reflected radar signals which are produced by reflection of said radar signals from stationary objects based on the detected frequencies of said reflected radar signals; and
- determining velocity of said vehicle based on the frequency of said radar frequency signals when said radar signals were reflected from said stationary objects.

9. The method for modulating the intensity of at least one headlight of a motor vehicle as recited in claim 1 wherein said step of modulating the intensity of said at least one headlight comprises the step of switching said at least one headlight from said high beam mode to said low beam mode.

10. A method for modulating the intensity of at least one headlight of a motor vehicle, said headlight being capable of operation in at least a high beam mode and a low beam mode, said method comprising the steps of:
- transmitting a radar signal;
- receiving reflections of said radar signal in a plurality of pulses;
- generating a radar return signal in response to said reflected radar signal;
- performing a time domain to frequency domain transform of said radar return signal to produce a radar frequency signal;
- determining if any portion of said reflected radar signal was produced by said radar signal being reflected from a significant object;
- determining velocity of said vehicle;
- determining if any significant object is moving relative to said vehicle based on said velocity of said vehicle and said radar frequency signal;
- determining if any moving object is within a predetermined distance from said vehicle based on said radar frequency signal; and
- modulating the intensity of said at least one headlight if any moving object is within said predetermined distance from said vehicle.

11. The method for modulating the intensity of at least one headlight of a motor vehicle as recited in claim 10 wherein the step of transmitting a radar signal comprises the steps of:
- transmitting a radar signal in blocks of pulses; and
- directing said radar signal at a plurality of angular positions.

12. The method for modulating the intensity of at least one headlight of a motor vehicle as recited in claim 10 wherein the step of performing a time domain to frequency domain transform of said radar return signal comprises the step of performing a fast Fourier transform on said radar return signal to produce said radar frequency signal.

13. The method for modulating the intensity of at least one headlight of a motor vehicle as recited in claim 12 wherein the step of determining if any of said reflected radar signals are representative of a significant object comprises the steps of:
- estimating a noise power level for said radar frequency signal;
- establishing a threshold level which is greater than said noise power level;
- comparing said radar frequency signal to said threshold level; and
- indicating that a significant object has been detected when said radar frequency signal exceeds said threshold level.

14. The method for modulating the intensity of at least one headlight of a motor vehicle as recited in claim 10 wherein said step of determining velocity of said vehicle comprises the steps of:
- distinguishing portions of said radar return signals produced by reflection of said radar signals from stationary objects; and
- calculating velocity of said vehicle based on the frequencies of said portions of said radar return signals produced by reflection from said stationary objects.

15. An apparatus for modulating the intensity of at least one headlight of a motor vehicle, said headlight being capable of operation in at least a high beam mode and a low beam mode, said apparatus comprising:

radar means for transmitting a radar signal in blocks of pulses, for receiving reflections of said radar signal and for generating a radar return signal indicative of said reflections of said radar signal;

processor means for controlling said radar means, for processing said radar return signal to determine from the phase shift of said reflected radar signal if said radar return signal was produced by reflections of said radar signal from objects which are moving relative to said vehicle, for processing said radar return signal to determine distances to said moving objects and for generating a modulate headlights signal in response to said moving objects and said distances to said moving objects; and modulator means for modulating the intensity of said at least one headlight in response to said modulate headlights signal.

16. The apparatus for modulating the intensity of at least one headlight of a motor vehicle as recited in claim 15 wherein said radar means comprises:

an antenna for transmitting and receiving said radar signal;

a transmitter, coupled to said antenna, for generating said radar signal in response to transmit control signals generated by said processor means; and a receiver circuit, coupled to said antenna, for generating said radar return signal in response to said reflections of said radar signal received by said antenna.

17. The apparatus for modulating the intensity of at least one headlight of a motor vehicle as recited in claim 16 wherein said radar means further comprises antenna control means for scanning said antenna whereby said radar signal is transmitted at a plurality of angular positions in response to scan control signals generated by said processor means.

18. The apparatus for modulating the intensity of at least one headlight of a motor vehicle as recited in claim 15 wherein said processor means performs a time domain to frequency domain transform on said radar return signal to determine if said radar return signal was produced by reflection of said radar signal from an object which is in motion relative to said vehicle.

19. The apparatus for modulating the intensity of at least one headlight of a motor vehicle as recited in claim 18 wherein said processor means performs said time domain to frequency domain transform by performing a fast Fourier transform on said radar return signal.

20. The apparatus for modulating the intensity of at least one headlight of a motor vehicle as recited in claim 15 wherein said processing means compares said distances to said moving objects to a predetermined distance, generates a signal to modulate the intensity of said at least one headlight from said high beam mode to said low beam mode when at least one of said moving objects is within said predetermined distance from said vehicle, and does not generate a signal to modulate the intensity of said at least one headlight from said low beam mode to said high beam mode if said distance to said moving objects remains determinable and at least one of said moving objects remains within said predetermined distance from said vehicle.

* * * * *